(12) United States Patent
Duppong et al.

(10) Patent No.: US 9,085,203 B2
(45) Date of Patent: Jul. 21, 2015

(54) TIRE LOAD SENSING SYSTEM

(71) Applicant: Deere & Company, Moline, IL (US)

(72) Inventors: Steven A. Duppong, Cedar Falls, IA (US); Bruce L. Upchurch, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 92 days.

(21) Appl. No.: 13/953,278

(22) Filed: Jul. 29, 2013

(65) Prior Publication Data

US 2015/0032287 A1 Jan. 29, 2015

(51) Int. Cl.
*B60C 23/00* (2006.01)
*G01S 15/08* (2006.01)
*G01G 19/08* (2006.01)
*B60C 23/04* (2006.01)
*B60C 23/06* (2006.01)

(52) U.S. Cl.
CPC ............ *B60C 23/00* (2013.01); *B60C 23/0408* (2013.01); *B60C 23/067* (2013.01); *G01G 19/08* (2013.01); *G01S 15/08* (2013.01); *B60G 2300/082* (2013.01); *B60G 2400/252* (2013.01); *B60G 2400/60* (2013.01); *B60G 2400/82* (2013.01); *B60G 2401/176* (2013.01)

(58) Field of Classification Search
CPC .. B60C 23/00; B60C 23/0408; B60C 23/067; G01S 15/08; G01G 19/08; B60G 2400/82; B60G 2400/082; B60G 2400/252; B60G 2400/60; B60G 2400/176
USPC ............................................................ 701/1
See application file for complete search history.

(56) References Cited

U.S. PATENT DOCUMENTS

| 6,449,582 | B1 | 9/2002 | Chaklader | |
|---|---|---|---|---|
| 2003/0201881 | A1* | 10/2003 | Headley et al. | 340/443 |
| 2004/0148078 | A1* | 7/2004 | Nakano et al. | 701/41 |
| 2008/0103659 | A1* | 5/2008 | Mancosu et al. | 701/41 |
| 2009/0173147 | A1* | 7/2009 | Sandomirsky et al. | 73/84 |
| 2011/0126617 | A1* | 6/2011 | Bengoechea Apezteguia et al. | 73/146 |
| 2011/0248861 | A1 | 10/2011 | Corrado | |
| 2013/0278406 | A1* | 10/2013 | Weston | 340/442 |

FOREIGN PATENT DOCUMENTS

| EP | 2583545 A1 | 4/2013 |
|---|---|---|
| GB | 2450377 A | 12/2008 |
| JP | 2006010593 A | 1/2006 |

OTHER PUBLICATIONS

European Search Report issued in counterpart application No. 14170607.7, dated Dec. 12, 2014 (8 pages).

* cited by examiner

*Primary Examiner* — Mary Cheung
*Assistant Examiner* — Frederick Brushaber

(57) ABSTRACT

A vehicle tire load sensing system includes distance sensors mounted on the vehicle near each tire. The distance sensors generate distance signals representing a distance from the sensor to a track that is left in the soil during forward vehicle travel. Pressure sensors generate tire pressure signals. A temperature sensor senses the ambient temperature. A control unit receives the distance signals, the pressure signals and the temperature signals. The control unit compensates the distance signals as a function of the sensed temperature. The control unit generates filtered distance signals, and determines a tire deflection value from the filtered distance signal. The control unit determines the tire load as a function of the tire deflection value, the pressure signal and stored information relating tire load to tire deflection and tire pressure.

6 Claims, 4 Drawing Sheets

TIRE LOAD SENSING SYSTEM

FIELD OF THE INVENTION

The present disclosure relates to a tire load sensing system.

BACKGROUND OF THE INVENTION

It is desired to measure or sense the dynamic load on the tires of a tractor. Such information could be used to help automate a tire inflation system so that such a system would automatically change the tire pressure to respond to the axle load conditions. Such information could be used in construction or agricultural front end loader to determine the amount of weight that has been picked up by the loader. Such information could be used as a run flat or flat tire detection system, or it could be used could be used to determine axle loads on trailer systems.

SUMMARY

According to an aspect of the present disclosure, a tire load sensing system is provided for a vehicle having tires which support the vehicle on a surface. The tire load sensing system includes distance sensors mounted on the vehicle near each tire. The distance sensors generate distance signals representing a distance from the sensor to the surface.

The distance sensors are preferably conventional ultrasonic distance sensors, and are aimed at the compressed track that is left in the soil during forward vehicle travel. Pressure sensors generate tire pressure signals. A temperature sensor senses the ambient temperature. A control unit receives the distance signals, the pressure signals and the temperature signals. The control unit compensates the distance signals as a function of the sensed temperature. The control unit generates filtered distance signals, and determines a tire deflection value from the filtered distance signal. The control unit determines the tire load as a function of the tire deflection value, the pressure signal and stored information relating tire load to tire deflection and tire pressure.

DETAILED DESCRIPTION OF THE DRAWINGS

Figure 1:
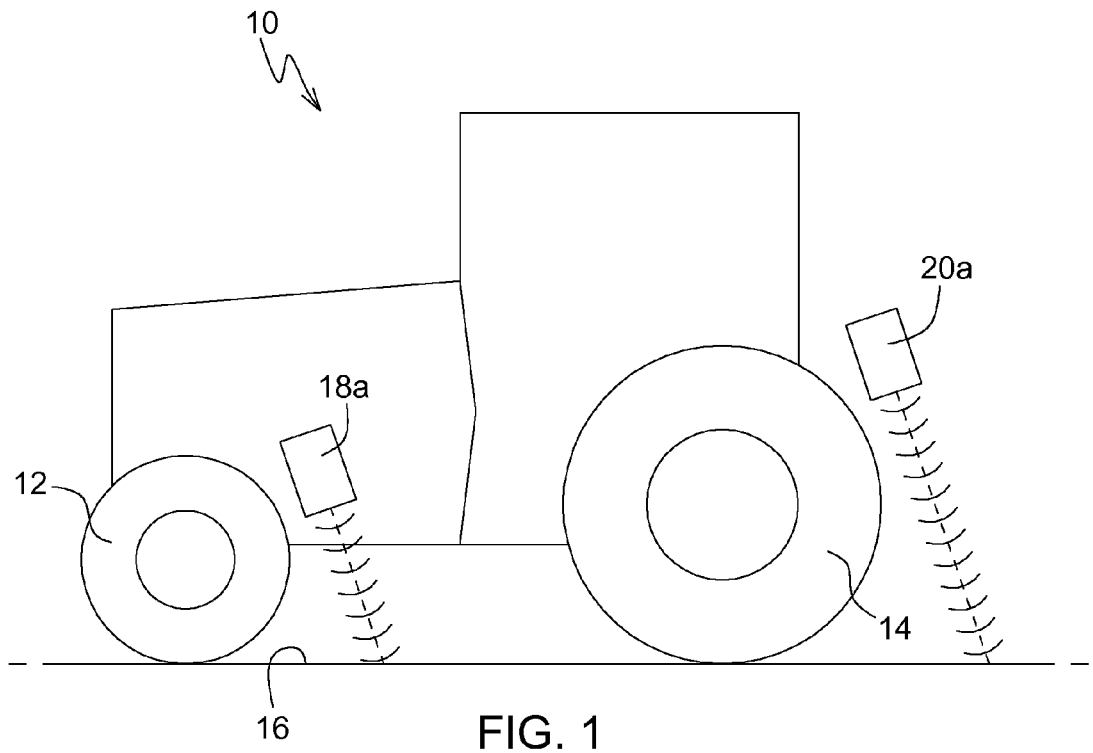
FIG. 1 is a simplified schematic side view of a vehicle with ultrasonic distance sensors and having fully inflated tires.

Referring to FIG. 1, a vehicle 10 has fully inflated front and rear tires 12, 14 which rest on a surface 16. A distance sensor 18a is mounted on the vehicle near to the left front tire 12 and at a distance A1 above the surface 16. A distance sensor 20a is mounted on the vehicle near to the left rear tire 14 and at a distance B1 above the surface 16.

Figure 2:
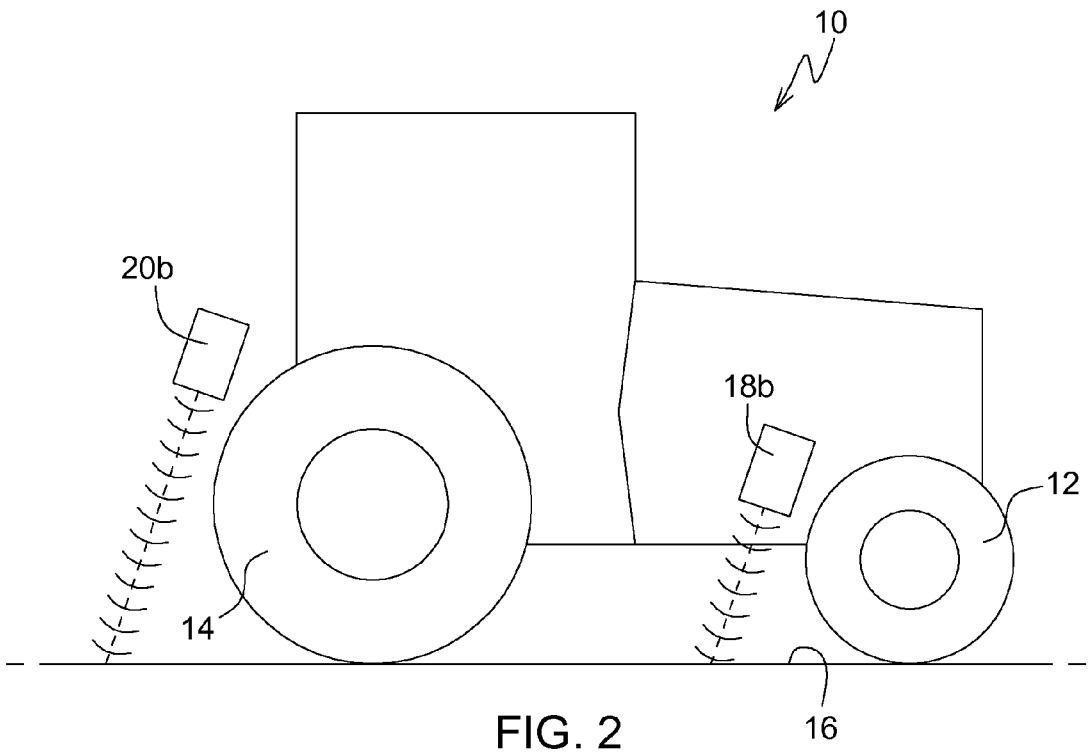
FIG. 2 is a simplified schematic side view of a vehicle with ultrasonic distance sensors and having partially deflated tires.

FIG. 2 is similar to FIG. 1, except that the tires 12 and 14 are partially deflated so that distance sensor 18b is at a smaller distance A2 above the surface 16, and distance sensor 20b is at a smaller distance B2 above the surface 16. The distance sensors 18, 20 are preferably conventional ultrasonic distance sensors, and they are mounted to the tractor chassis so that the field of view of each sensor is looking behind the corresponding tire with respect to the normal forward travel direction of the tractor 10. Thus, the sensors 18, 20 will sense the distance to the compressed track that is left in the soil during forward vehicle travel. This provides a consistent target surface in relationship to the axle of the tractor 10.

The distance sensors could be placed inside the tires on the rims and measure the deflection from the inside of the tire and transmit the data to the vehicle controller via a wireless data link. The distance sensor could also be mounted to the front and rear axle of the tractor in order to detect subtle changes in the distance from the axle to the ground based on tire pressure.

Figure 3:
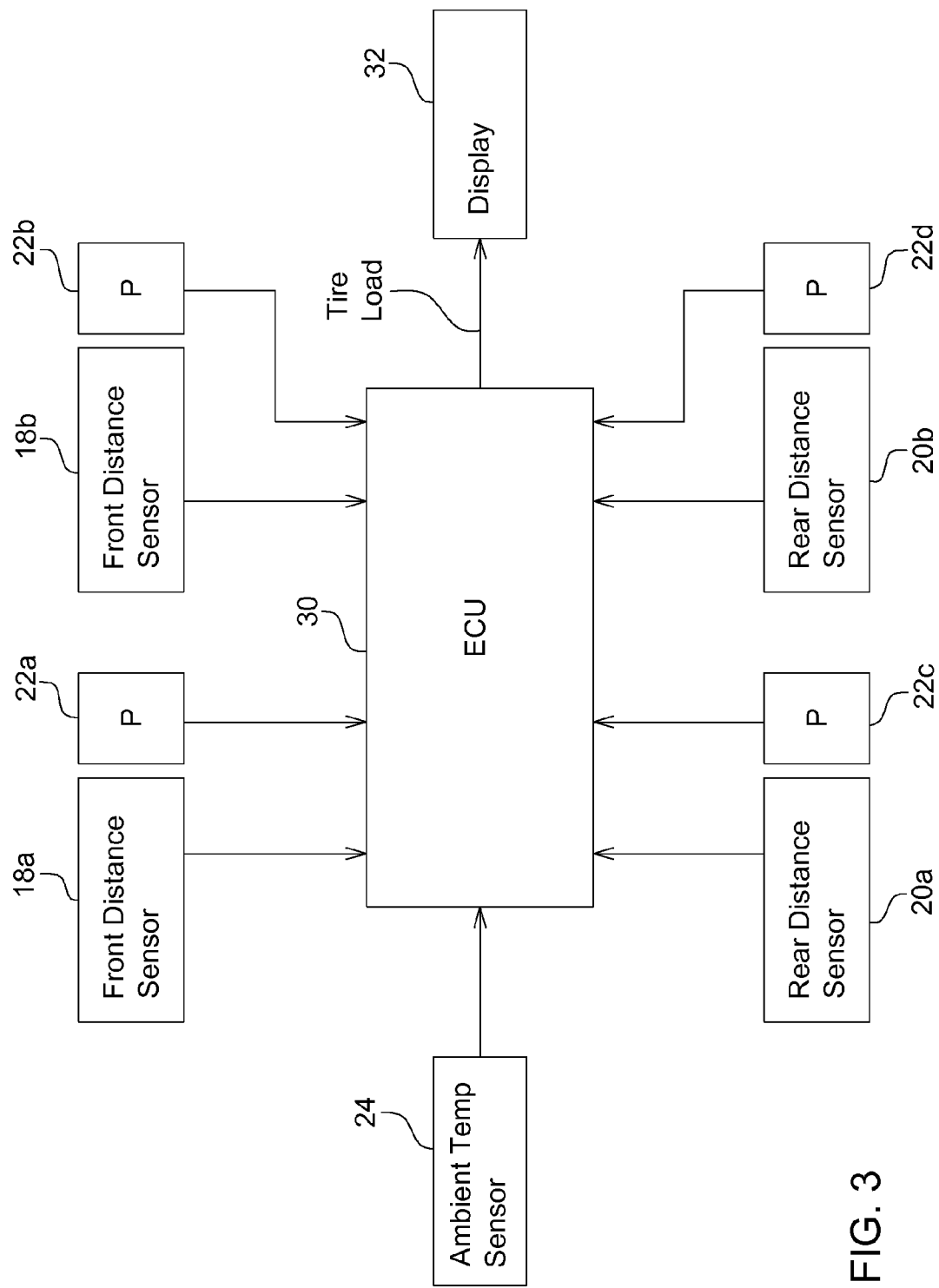
FIG. 3 is a schematic block diagram of a signal processing system which processes the signals from the sensors of FIGS. 1 and 2.

Referring now to FIG. 3, the signal processing system includes the left and right front distance sensors 18a, 18b, and left and right rear distance sensors 20a, 20b. The distance sensors 18a, 18b, 20a and 20b are preferably commercially available ultrasonic distance sensors. Pressure sensors 22a-22d sense the pressure of each of the corresponding tires. A temperature sensor 24 senses the ambient temperature and is preferably located on a chassis of the tractor 10. The sensed temperature is used to compensate the ultrasonic distance signals from sensors 18 and 20.

Figure 4:
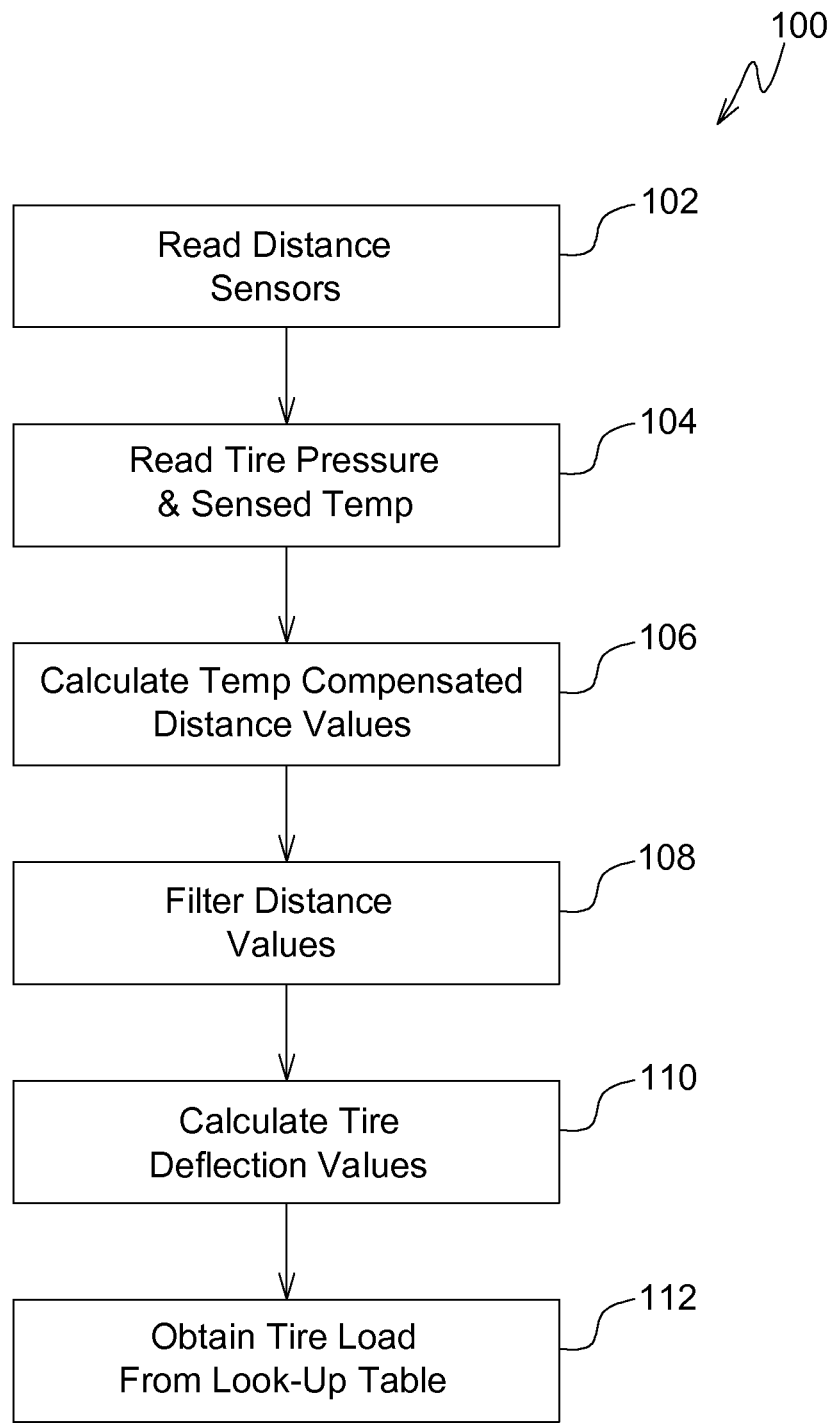
FIG. 4 is a flow chart of an algorithm performed by the electronic control unit of FIG. 3.

An electronic control unit (ECU) 30 is connected to receive signals from all the sensors 18, 20 22 and 24. The ECU 30 processes the sensor signals and generates a tire load output signal by executing an algorithm 100 represented by FIG. 4. The tire load output signal is displayed on a conventional display 32 in an operator station (not shown) on the tractor 10. The conversion of the flow chart into a standard language for implementing the algorithm described by the flow chart in a digital computer or microprocessor, will be evident to one with ordinary skill in the art.

In step 102 the ECU 30 obtains raw distance data from the distance sensors 18a, 18b, 20a and 20b.

In step 104, the ECU 30 reads the tire pressure sensors and the temperature sensor 24.

In step 106 the ECU 30 calculates compensates the distance data based on the sensed temperature.

In step 108 the compensated distance values are filtered using a running average method.

In step 110 an offset value based on the sensor height is subtracted from the distance values to obtain tire radius or deflection values.

Figure 5:
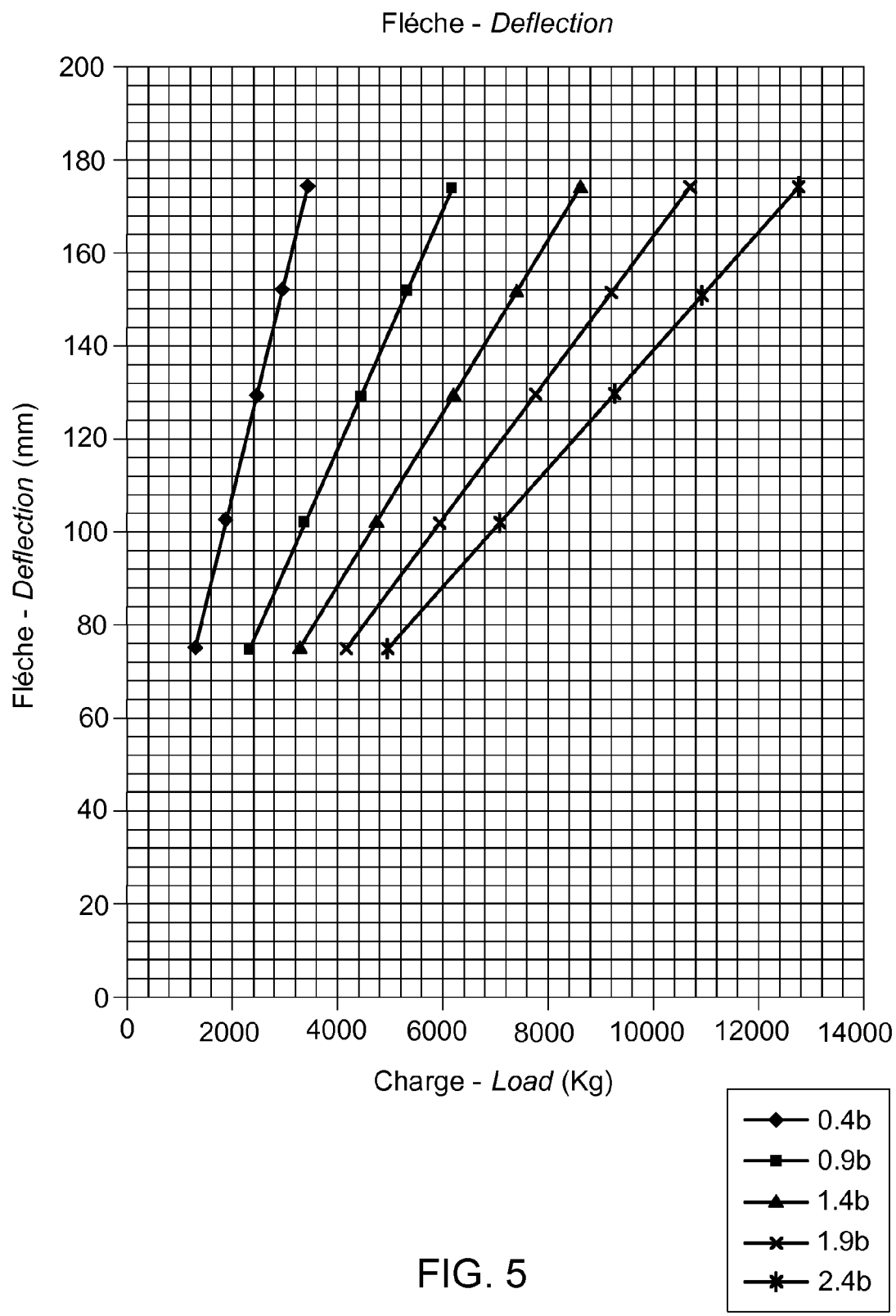
FIG. 5 is a table containing tire deflection values at known pressures.

In step 112 tire load values are obtained by entering the sensed tire deflection and tire pressure values into a stored look-up table containing tire deflection values at known pressures, based on information published by tire manufacturers. An example of such a table is illustrated by FIG. 5.

The ECU 30 may also, in response to changes in the determined load values, generate tire pressure adjustment values which could be used by the tire inflation system (not shown) to adjust the tire pressures to desired pressures.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. In a vehicle having tires which support the vehicle on a surface, a tire load sensing system comprising:
a distance sensor mounted on the vehicle and generating a distance signal representing a distance from the sensor to the surface;
a pressure sensor for generating a tire pressure signal; and
a control unit which receives the distance signal and the pressure signal, the control unit generating a filtered distance signal, the control unit determining a tire deflection value from the filtered distance signal, and the control unit determining the tire load as a function of the tire deflection value, the pressure signal and stored information relating tire load to tire deflection and tire pressure.

2. The tire load sensing system of claim 1, further comprising:
a temperature sensor for sensing ambient temperature, the control unit compensating the distance signals as a function of the sensed temperature.

3. The tire load sensing system of claim 1, wherein:
the distance sensor comprises an ultrasonic distance sensor mounted adjacent to the tire.

4. In a vehicle having a plurality of tires which support the vehicle on a surface, a tire load sensing system comprising:
a plurality of distance sensors, each mounted on the vehicle adjacent to a corresponding one of the tires and each generating a distance signal representing a distance from the sensor to the surface;
a plurality of pressure sensors, each for generating a tire pressure signal for a corresponding one of the tires; and
a control unit which receives the distance signals and the pressure signals, the control unit generating a filtered distance signal for each tire, the control unit determining a tire deflection value from each filtered distance signal, and the control unit determining tire load values as a function of the tire deflection values, the pressure signals and stored information relating tire load to tire deflection and tire pressure.

5. The tire load sensing system of claim 4, further comprising:
a temperature sensor for sensing ambient temperature, the control unit compensating the distance signals as a function of the sensed temperature.

6. The tire load sensing system of claim 4, wherein:
the distance sensor comprises an ultrasonic distance sensor mounted adjacent to the tire.

* * * * *